E. S. WARD & J. A. HAMILTON.
GAGE FOR CROSSCUT SAWS.
APPLICATION FILED JAN. 23, 1907.
943,760.
Patented Dec. 21, 1909.
2 SHEETS—SHEET 1.
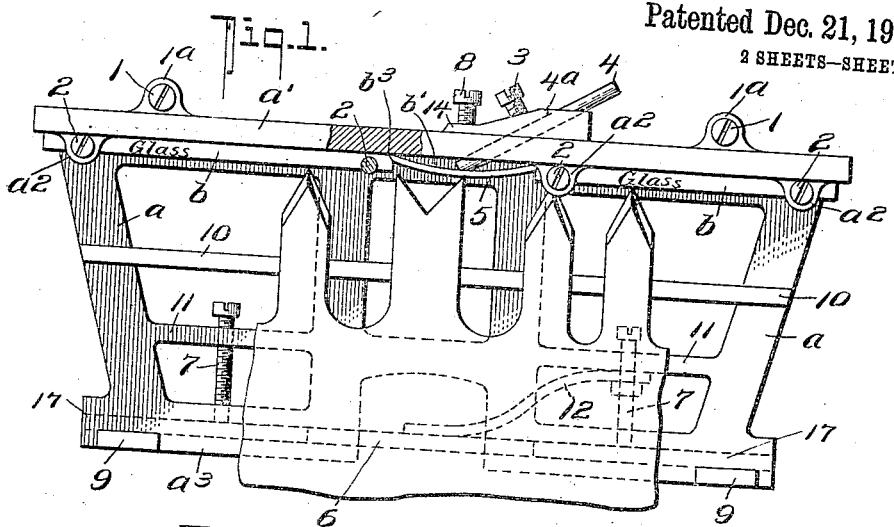
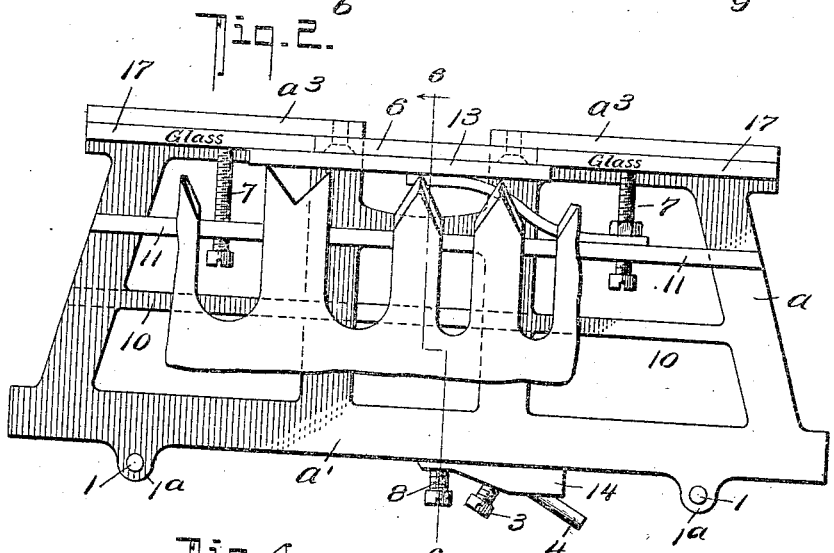
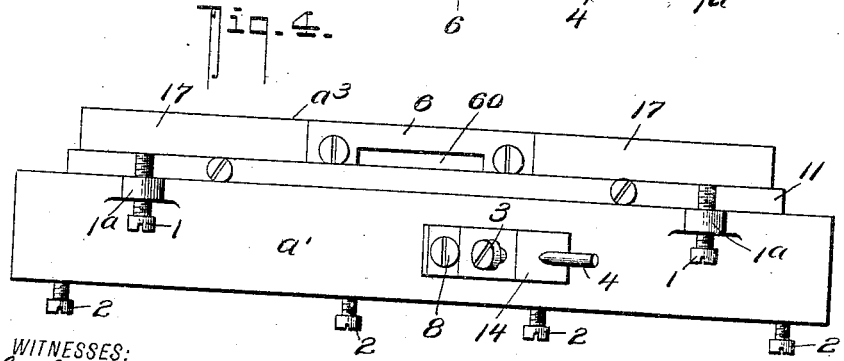
WITNESSES:
F. C. Gibson.
John T. Schrott.
INVENTORS.
Eugene S. Ward.
James A. Hamilton.
BY
Fred G. Dieterich
ATTORNEYS

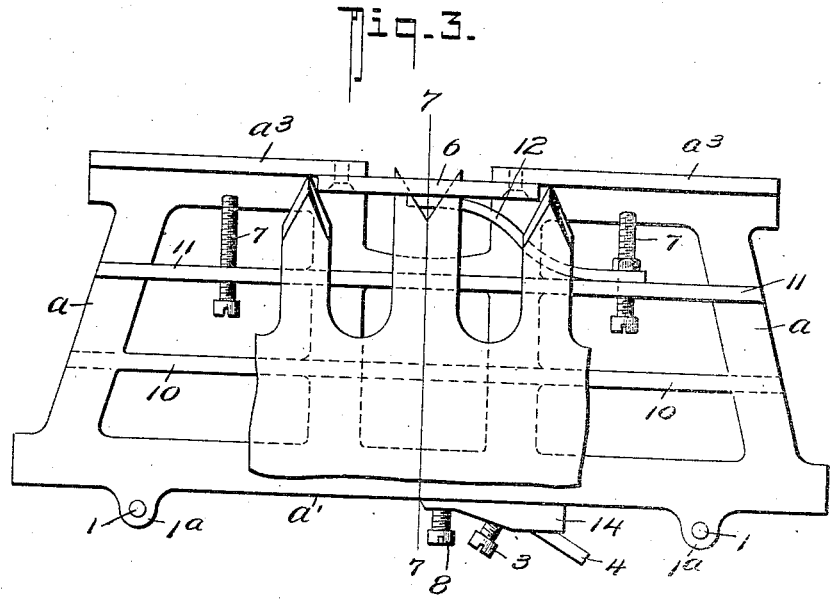
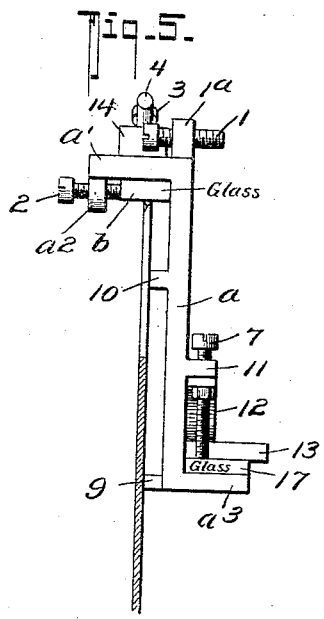
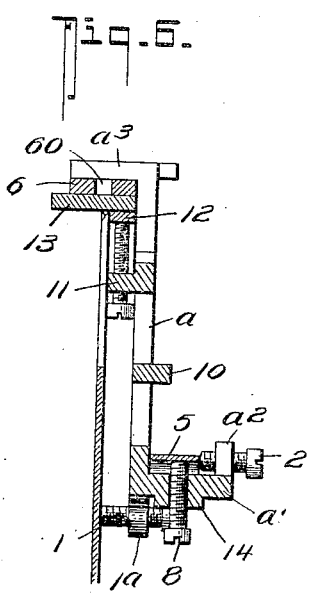
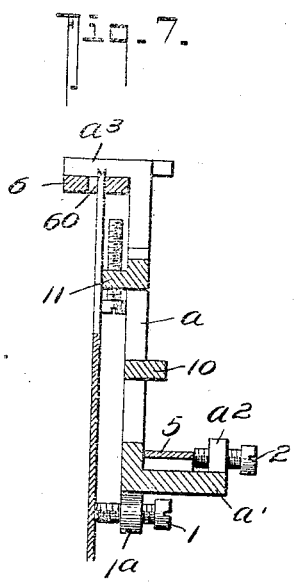

UNITED STATES PATENT OFFICE.

EUGENE S. WARD AND JAMES A. HAMILTON, OF PORTLAND, OREGON.

GAGE FOR CROSSCUT-SAWS.

943,760.   Specification of Letters Patent.   Patented Dec. 21, 1909.

Application filed January 23, 1907. Serial No. 353,684.

*To all whom it may concern:*

Be it known that we, EUGENE S. WARD and JAMES A. HAMILTON, residing in Portland, in the county of Multnomah and State of Oregon, have invented a new and Improved Gage for Crosscut-Saws, of which the following is a specification.

This invention is in the nature of an improved means for accurately gaging and testing the raker teeth of crosscut saws, as well as jointing the saw teeth, and it primarily seeks to provide a simple and economically constructed device, adapted to be adjustably and reversibly fitted over the saw teeth, which under one adjustment provides for readily and accurately gaging and testing raker teeth of cross cut saws in swaging the said teeth, which under another adjustment provides for quickly and accurately filing the points of the raker teeth, whereby to make the said points of the teeth all of the same length and under a third adjustment to provide a simple and effective means for accurately holding the file in a plane at right angles to the plate of the saw for jointing the saw.

In the practical application of means heretofore employed, which embodies some of the generic features of our complete device, smooth frictionless surfaces in a perfect plane for resting upon the cutting teeth, while engaging the raker teeth for swaging, in the nature of a glass plate have been provided, and coöperating with said surfaces, gage devices consisting of a fixedly set point or screw have also been used. From practical experience with gages embodying the glass plates and the pin or set screw gage devices, we have found that while generally effective for their intended purposes, such arrangement of parts do not meet all the desired requirements, for the reason that since the glass plates are usually secured in operative position by gluing or pasting them on the gage frame, that in wet weather or damp climates, the said parts readily become loosened and require re-gluing or pasting, and further, in case the drag teeth, when sliding the gage device thereover, be a little too long, the teeth in coming in contact with the fixed gage point or set screw, frequently become nicked or otherwise mutilated.

Our invention seeks to provide a gaging means of the character stated, embodying certain features whereby to overcome the objections above noted and others to be hereinafter referred to, and the said invention, in its specific structure, consists in certain details and peculiar combination of parts, all of which will be hereinafter fully explained, particularly pointed out in the appended claims and illustrated in the accompanying drawings, in which:—

Figure 1, is a side elevation of our gage, the same being shown adjusted upon the saw blade for testing the raker teeth in swaging. Fig. 2, is a similar view of the opposite side, the gage being reversed and mounted on the teeth for gaging or pointing the raker teeth. Fig. 3, is a similar view showing the several parts adjusted for filing the raker teeth. Fig. 4, is a plan view of the entire device. Fig. 5, is an end elevation of our invention. Fig. 6, is a similar view taken on the line 6—6 of Fig. 2. Fig. 7, is a like view taken on the line 7—7 of Fig. 3.

In the practical application of our invention, the same embodies a skeleton frame having substantially the shape shown in the drawings and consisting of a body portion $a$, one end of which merges with a lateral extension $a'$, which is disposed in a true, right angle to the body $a$ and has at the outer edge a series (four being shown) of pendent and threaded ears $a^2$—$a^2$, in each of which is mounted a set screw 2, the purpose of which will presently appear. At the opposite end, the body $a$ has a lateral member $a^3$ that extends reversely to the member $a'$ and is also positioned at right angles to the said body $a$.

$b$—$b$ designate glass plate members which are tightly clamped to lie flatwise against the under side of the extension $a'$ by the set screws 2, and these plates provide a true plane surface of perfectly smooth straight edge that permits the sliding of the gage back and forth over the points of the cutting teeth, without friction and without danger of injuring the said teeth. The glass plates $b$—$b$ are separated, to form, as it were, an intervening space $b'$, into which extends the gaging device which closes the gap between the plates $b$—$b$ and which, in our construction, is in the nature of a steel bow spring member, which is securely held in position and in the longitudinal plane of the plates $b$—$b$ by having its opposite ends tapering to a chisel like point, see Fig. 1, whereby they will fit correspondingly formed recesses $b^3$ in the adjacent ends of the glass plates.

To provide for a proper set to the spring member 5 relative to that face of the glass plate traversed by the saw teeth, a set screw 8 is provided which is mounted in the thickened part 14 of the gage frame.

By providing a bowed spring plate as shown and described, it is manifest that in reciprocating the gage on the teeth as shown, should the drag teeth be too long, they will slide over the said gage member without danger of being nicked or mutilated as is often the case when the fixed point or set screw is utilized for the same purpose.

In the thickened part 14 of the gage frame is adjustably mounted a pin 4, adjustably held in the diagonally disposed socket $4^a$, by a set screw 3. This pin 4 is utilized for bringing the cutting edge of the drag tooth to a perfect square with reference to the body of the saw blade but it is only used when the spring 5 is removed, the latter when it is used, operating to adjust the length of the drag tooth in the process of swaging, it also aiding in perfecting the length of the cutting edge of the tool, since the setting of the blade 5 is readily adjusted by a screw 8 and to a point almost parallel with the cutting edge of the tooth and in such manner that it will not nick the said cutting edge.

9 and 10 designate horizontal guide ribs formed on one face of the frame $a$ for sustaining the gage in a proper and uniform vertical plane parallel with that of the saw plates.

13 designates a hardened member which forms the file gage plate when the device is adjusted for filing the points of the raker teeth so that the said points of each tooth may be exactly of the same length.

The plate 6 has a longitudinal slot 60 for the passage therethrough of the raker teeth and the said plate is held on the separated ends of the lateral extensions $a^3$ as clearly shown in Fig. 3, which illustrates the manner in which the gage is used during the operation of filing the points of the raker teeth.

By our construction of gage device the jointing file designated 13 in the drawings is laid flatwise on the plate 6, see Fig. 2, and it is firmly held to its operative position by a stout steel spring 12 secured to a lateral flange 11, which flange also acts as a guide for the side of the saw blade, which when the gage is used for jointing, is held in a true vertical plane by means of set screws 1—1 that are mounted in the ears $1^a$—$1^a$ of the main frame, which screws in practice, are set to suit either the thin or the thick back saws and thus cause the saw teeth to travel perfectly square on the file.

7—7 designate set screws that engage the flange 11 and have for their purpose to hold the glass plates 17 at the opposite ends of the frame against the foot or lateral extensions $a^3$ as clearly shown in Figs. 2 and 5. The said glass plates form a rest for the cutting teeth while cutting the drag teeth the required length, and one of the screws also secured the stout spring 12 to the frame, as shown.

From the foregoing, taken in connection with the accompanying drawings, it is thought that the complete structure, the manner of operation and the advantages of our invention will be readily apparent to those skilled in the art to which it appertains.

By securing the glass plate in the manner stated, danger of their becoming loosened is minimized, and by providing a bowed or curved face gage, all danger of nicking and extra long saw teeth is avoided.

The gage can be illustrated adapted for the different uses for which it is provided and by reason of the peculiar arrangement of the several parts, the work of gaging, filing and jointing the teeth can be expeditiously and accurately accomplished.

Having thus described our invention, what we claim and desire to secure by Letters Patent, is:—

1. In a gage for cross cut saws of the character described the combination with the body of the gage, having a lateral extension and a smooth traversing surface separated midway, whereby to form a gap, of a bow shaped spring metal gage member that straddles the gap in the smooth traversing surface, and an adjusting device therefor.

2. In a gage for cross cut saws of the character described, the combination with the body of the gage having a lateral extension and a smooth traversing surface separated midway to form a gap; of a pin diagonally mounted in the frame to project into the gap, and means for adjustably securing said pin in position.

EUGENE S. WARD.
JAMES A. HAMILTON.

Witnesses:
A. T. LEWIS,
C. H. CLORTE.